Figure 11:
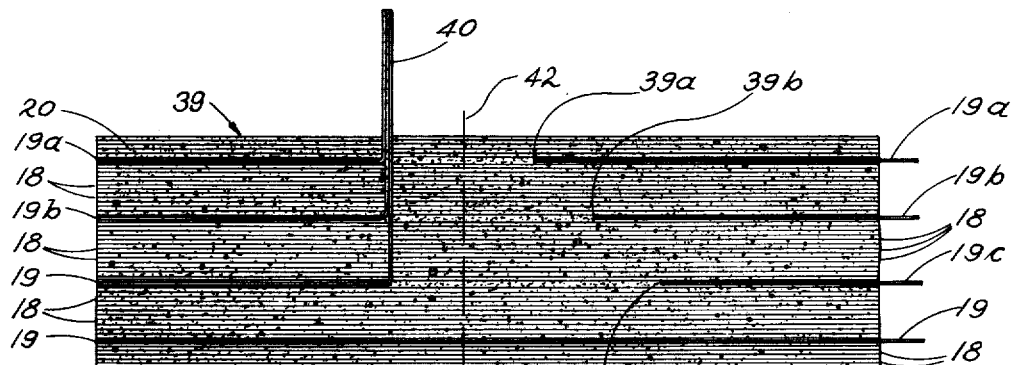

Dec. 18, 1951     J. B. BRENNAN     2,578,667
ELECTRODE FOR ELECTROLYTIC CONDENSERS
Filed Sept. 25, 1946     4 Sheets-Sheet 1
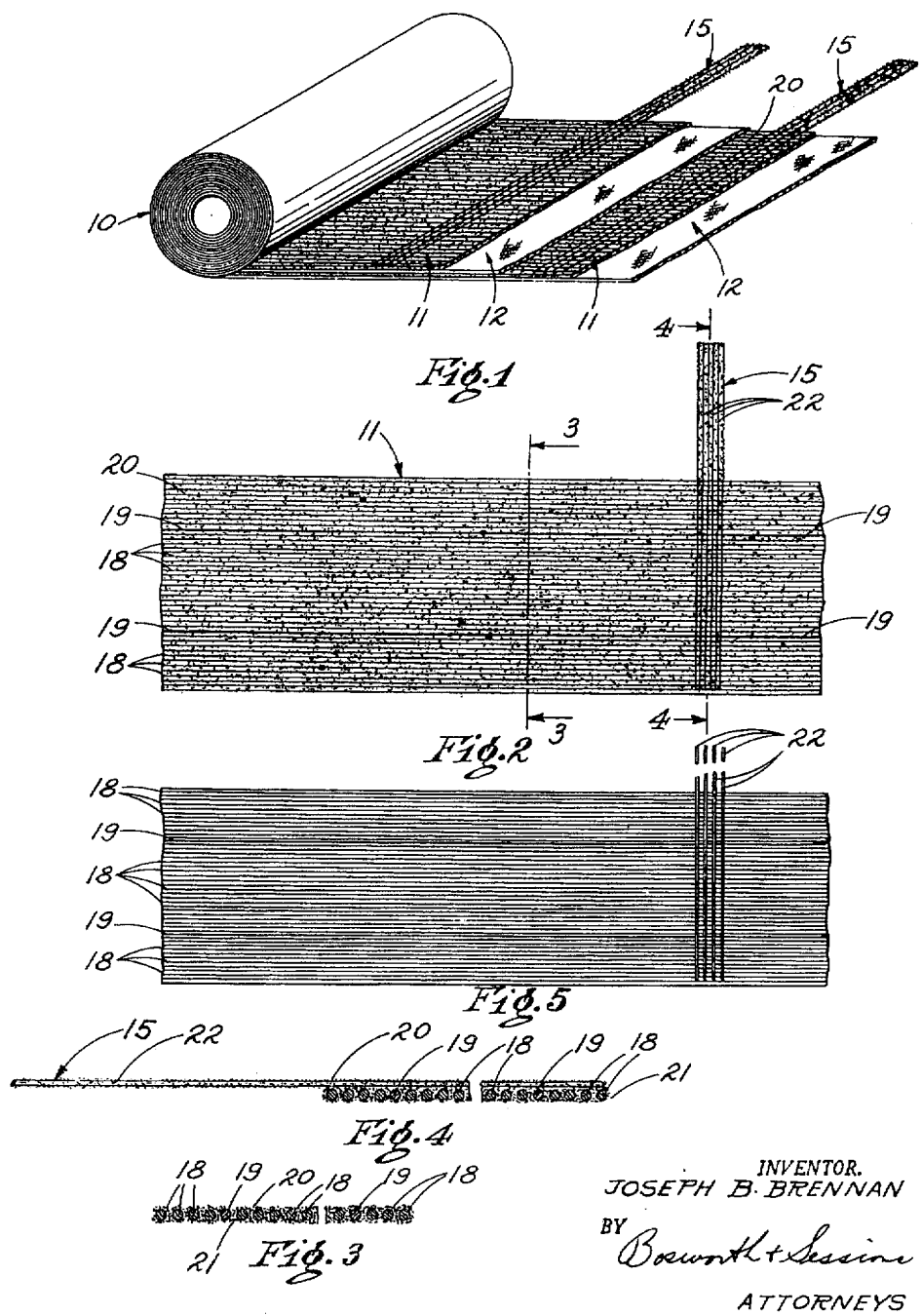
INVENTOR.
JOSEPH B. BRENNAN
BY
Brown + Sessions
ATTORNEYS

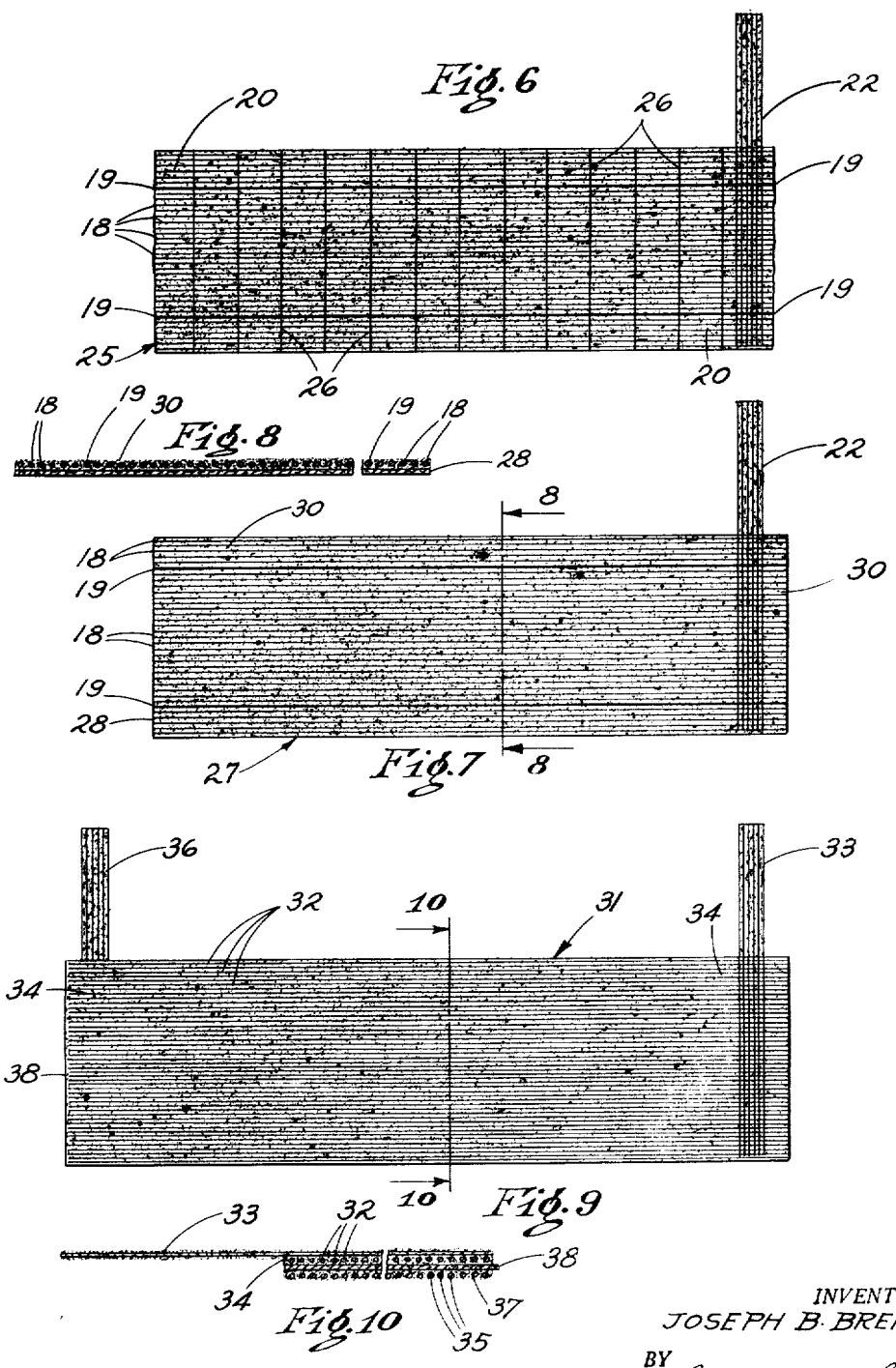

Dec. 18, 1951  J. B. BRENNAN  2,578,667
ELECTRODE FOR ELECTROLYTIC CONDENSERS
Filed Sept. 25, 1946  4 Sheets-Sheet 3

INVENTOR.
JOSEPH B. BRENNAN
BY
Bosworth & Sessions
ATTORNEYS

Dec. 18, 1951     J. B. BRENNAN     2,578,667
ELECTRODE FOR ELECTROLYTIC CONDENSERS

Filed Sept. 25, 1946     4 Sheets-Sheet 4

INVENTOR.
JOSEPH B. BRENNAN
BY
Bosworth & Sessions
ATTORNEYS

Patented Dec. 18, 1951

2,578,667

UNITED STATES PATENT OFFICE 2,578,667

ELECTRODE FOR ELECTROLYTIC CONDENSERS

Joseph B. Brennan, Bratenahl, Ohio, assignor to Everett D. McCurdy, trustee

Application September 25, 1946, Serial No. 699,108

2 Claims. (Cl. 175—315)

This invention relates to electrolytic devices such as electrolytic condensers, rectifiers, lightning arresters and the like, and more particularly to electrodes of the type having electroformed dielectric films thereon for such electrolytic devices.

The general objects of the invention are to provide improved electrodes of high capacity for the size and amount of metal embodied in them; to provide compact and efficient electrode and separator assemblies for such electrolytic devices; to provide efficient electrodes of high capacity which can be manufactured economically and to provide efficient and economical methods for making such electrodes.

As described in detail in my Patent No. 2,104,018, electrodes having surfaces composed of cohering particles of film-forming metal such as produced by a spray-depositing operation are highly advantageous in that the porous structure or layer made up of the cohering particles has a very large surface area as compared to the size of the electrode. The dielectric film conforms to the irregularities of the surface of the cohering metal particles and has a correspondingly large area, thus giving a condenser embodying such an electrode a much greater capacity than can be obtained in condensers embodying, for example, electrodes composed of metal foil. As described in my Patent No. 2,280,789, electrodes may also be provided by depositing the minute metallic particles on a porous base of woven cloth or the like, such a structure providing an electrode which is porous throughout and which has a very large capacity in comparison with its size.

According to the present invention, I obtain great capacities per unit of volume occupied by the electrode at low cost by using for the base material on which the metallic particles are deposited, unwoven layers composed of strands of various suitable materials such as natural or synthetic textile fibers, asbestos fibers, plastic fibers or filaments, fiber glass and wires. The strands may be in the form of fibers, single filaments, slivers, rovings, strips, yarns, threads, cords or the like. In producing such electrodes, the cost of the weaving operation incurred in the manufacture of cloth base electrodes is eliminated, the strands being held together by the cohering metallic particles comprising the conductive layers of the electrodes. One or more layers of parallel strands may be employed, the strands in one layer preferably extending transversely of the strands in adjacent layers. Where the strands are in the form of rovings, threads, cords and the like, the strands in a layer are preferably substantially parallel to each other. Where the strands are in the form of filaments or fibers, they may take random directions, but the material is preferably combed or carded so that the fibers or filaments extend generally in the same direction. The strands are not matted, felted or woven together prior to the deposition of the particles, but are bonded together and given strength by the cohering metallic particles. Whether one or more layers of strands are employed, the thickness of the electrodes can be maintained at a minimum for the amount of material used, because of the elimination of the crossing of the strands found in the ordinary woven fabric. The electrodes have ample strength, can be made very thin and flexible, and because of their thinness and permeability are highly efficient from the standpoints of power factor and resistance when incorporated in condensers.

Figure 12:
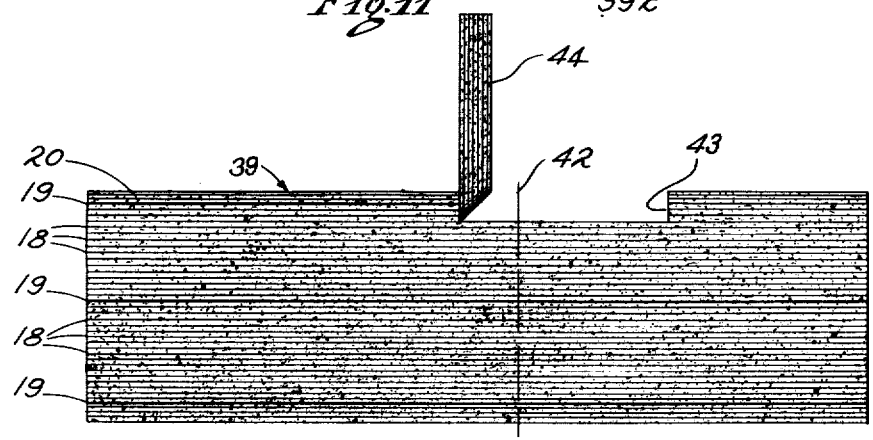
Figure 13:
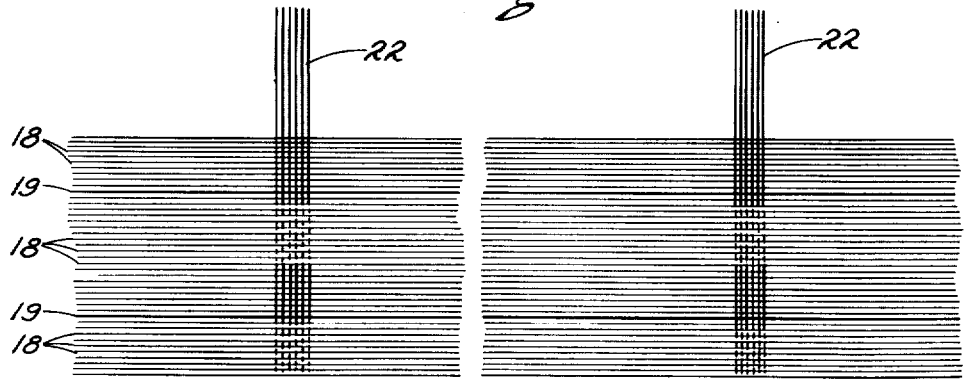
Figure 14:
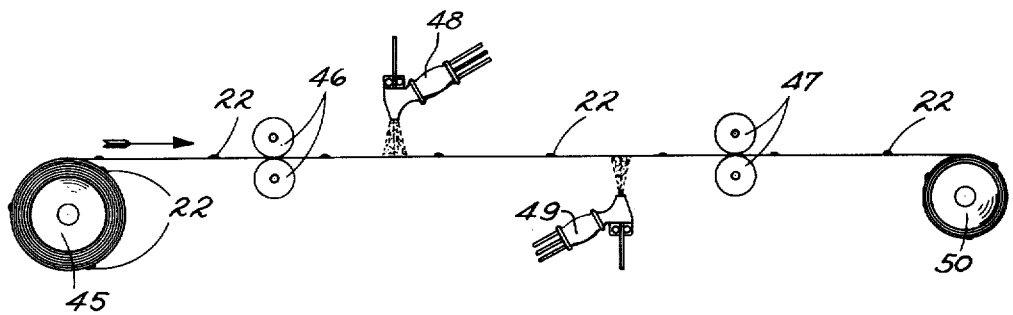
Figure 15:
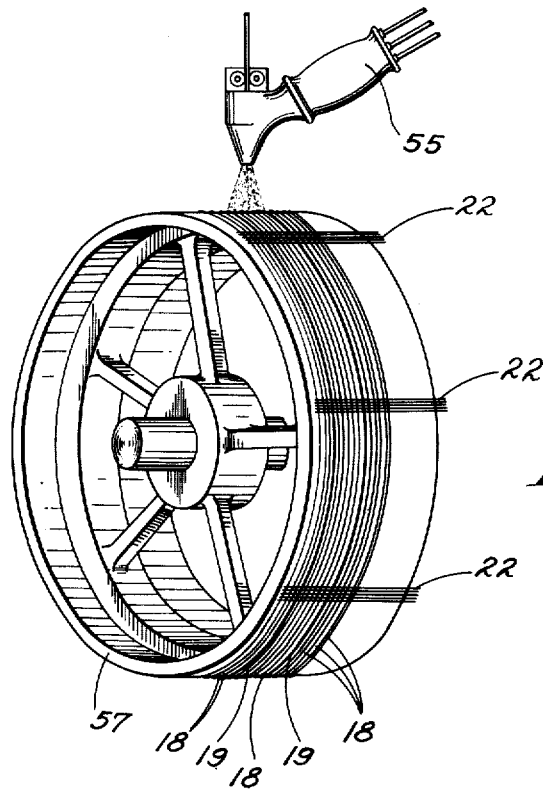

Referring now to the drawings which show preferred forms of my invention, Figure 1 illustrates a dry type electrolytic condenser embodying electrodes made according to my invention, the condenser being partially unrolled to illustrate the inner construction; Figure 2 illustrates one form of electrode for the condenser of Figure 1; Figures 3 and 4 are sectional views on an enlarged scale taken as indicated by the lines 3—3 and 4—4 of Figure 2; Figure 5 illustrates one step in the production of such electrodes; Figure 6 is a plan view of a slightly modified form of electrode; Figure 7 is a similar plan view of another modified form of electrode embodying a paper backing member; Figure 8 is a section on an enlarged scale taken along line 8—8 of Figure 7; Figure 9 is a view of a unitary assembly made up of two electrodes and a separator; Figure 10 is a section on an enlarged scale taken along line 10—10 of Figure 9; Figures 11 and 12 illustrate modified terminal constructions of my invention; Figures 13 and 14 diagrammatically illustrate steps in one method of producing electrodes embodying my invention; and Figure 15 diagrammatically illustrates a step in another method of producing electrodes embodying my invention. Throughout the drawings, like elements are indicated by like reference characters. The drawings are somewhat diagrammatic, the thickness of the metal layers and of the strands being exaggerated and not necessarily in correct proportion.

As shown in Figure 1, electrodes embodying the present invention may be incorporated in a condenser 10 of generally conventional construction in that it is a condenser of the rolled type embodying two electrodes 11 prevented from coming in contact with each other by separators 12 composed of porous, absorbent paper or the like. The electrodes are provided with transversely extending terminals 15 and the electrodes and spacers are impregnated with a suitable pasty film-maintaining electrolyte, various suitable electrolytes being known to those skilled in the art. The assembly may be rolled into substantially cylindrical form as shown and enclosed in a suitable casing (not shown). If the condenser is intended for alternate current service, then the metal of both electrodes is preferably aluminum, magnesium, tantalum or other suitable film-forming metal or alloy. If the condenser is intended for direct current service, only the anode need be composed of film-forming metal; the cathode in such a case can be composed of any metal, whether film-forming or not, which will not contaminate the electrolyte or cause corrosion in the device. For example, the film-forming metals noted above may be employed or other metals such as copper may be utilized.

The electrodes 11 in the embodiment shown are substantially identical in construction and as shown in Figure 2, each electrode comprises a plurality of closely spaced substantially parallel strands 18 extending longitudinally of the electrode and composed of a non-conducting material which will not contaminate the electrolyte, such as purified cotton or other cellulosic filaments, fibers, slivers, rovings, yarns, threads or cords, bundles of rayon or plastic filaments, asbestos fibers made into thread or cord, fiber glass, and the like. Preferably, but not necessarily, one or more wires 19 composed of the same metal as the cohering layers which form the active surfaces of the electrode are disposed along with the non-conducting strands to increase the conductivity of the assembled electrode. The wires 19, although appearing slightly larger in the drawing, are preferably of substantially the same diameter or thickness as the strands 18 so that the completed electrode will be of substantially uniform thickness throughout. Strands of a wide range of sizes and spacings may be employed. For example, threads of the type used in weaving the spacer gauze ordinarily incorporated in electrolytic condensers, and with 30 to 60 strands per inch of width, may be employed with good results. Also, a thin layer of cotton or other staple fibers combed or carded into substantial parallelism, or a layer composed of cords made by twisting together several threads may be employed. The terminal 15 comprises a plurality of wires 22 similar to the wires 19 extending transversely of the electrode and projecting beyond one edge of the electrode as shown. The whole assembly is completed by the layers 20 and 21 of finely divided minute cohering metallic particles which provide porous conductive layers of great effective area as the active surfaces of the electrode.

As shown diagrammatically in Figures 3 and 4, the layers 20 and 21 surround and conform somewhat in contour to the strands 18 and the wires 19, and to the wires 22 making up the terminal 15. Preferably the layers are produced by a spray depositing operation as described in my patents aforesaid and are from 0.001" to 0.005" in thickness. In the spraying operation, the minute particles of metal impinge upon the base material and against each other while in a molten or plastic state in such manner that they adhere firmly to the strands making up the base and the wires making up the terminal and cohere, i. e., become welded, to each other to provide a unitary conductive structure. While the individual particles are securely welded to each other, they are not welded throughout their entire surface areas, but rather the deposited surface is porous throughout, there being minute passageways, interstices, openings and the like between the particles, giving the entire structure a porous and absorbent quality and providing the electrode with a large area of metal exposed to the action of electrolyte when the electrode is incorporated in a condenser.

In producing electrodes of this type, it is only necessary to lay up the strands 18 and wires 19 and terminal wires 22 in the manner shown in Figure 5 and then coat the assembly to produce the layers 20 and 21. While the coating operation is preferably done by spray depositing as noted above, other methods for producing the cohering layers of finely divided metallic particles may be employed. For example, powdered metal may be deposited on the assembly of Figure 5, and then the whole subjected to a sintering operation under conditions of pressure and temperature which will bond the metallic particles together into porous conductive layers 20 and 21. When the layers are formed by sintering, it is desirable to employ non-combustible materials such as asbestos fibers, fiber glass or wires for the strands 18.

While the strands 18 are preferably composed of fibrous material which is permeable by the electrolyte, any stranded material which will not contaminate the condenser may be employed, for example, parallel wires composed of film-forming material may be utilized for the electrode itself, as well as for the terminal member. Terminals other than the parallel wires shown may be employed, foil terminals welded or sprayed to the electrode being satisfactory. Wire terminal members of the type shown in the drawing may be coated throughout as shown, but only the portion overlying the body of the electrode need be coated to bond the terminal and electrode together. Other suitable terminal constructions are shown in Figures 11 and 12 and are described below.

In Figure 6, a modified form of electrode 25 is illustrated. In this form of electrode, the strands 18, wires 19, terminal wires 22 and conductive layers 20 and 21 may be just as described above, but the electrode is further reinforced by the provision of a layer of spaced strands 26 extending substantially at right angles to the strands 18 and wires 19, and preferably composed of the same material as the strands 18. The transverse strands 26 are preferably disposed over the strands 18 before the metallic layers 20 and 21 are deposited. Thus, the deposited layers 20 and 21 bind the strands 26 into the electrode structure, and the strands 26 serve to reinforce and strengthen the electrode without increasing its resistance to bending about axes transverse to the electrode. Where thick electrodes of large capacity per unit of area are desired, several layers of parallel strands may be employed, the strands in one layer preferably extending transversely of the strands in adjacent layers.

In Figures 7 and 8, a further modification is illustrated in which the electrode indicated in general at 27 includes strands 18, wires 19 and terminal wires 22 as before, but in this case, the assembly of strands and wires is laid upon a sheet 28 of porous material, preferably a felted fibrous material, such as paper, asbestos sheet, felted glass fibers, or the like, suitable for use as a spacer or separator. The assembly is sprayed or coated from one side only, producing the conductive layer 30. This arrangement produces a unitary electrode and separator assembly, and such a structure can be made into a condenser without requiring the use of separately formed spacers 12 as required in the condenser of Figure 1, the sheets 28 of two similar electrodes 27 functioning as the spacers or separators for the condenser.

Figures 9 and 10 illustrate a still further modification of the invention in which two electrodes and a separator are incorporated in a single assembly indicated at 31. In this construction, one electrode consists of the parallel strands 32 and the terminal wires 33 bonded together by the cohering conductive layer 34, while the other electrode comprises the parallel strands 35 and terminal wires 36 bonded together by the conductive layer 37, these electrodes being separated by the porous spacer 38 which may be similar to the spacer 28. The spacer should be sufficiently porous to permit penetration of the electrolyte, but dense enough to prevent the metallic particles making up the layers 34 and 37 from coming into contact with each other. This assembly in effect constitutes two of the electrodes shown in Figures 7 and 8 produced upon opposite sides of a single separator strip. Such an assembly can be immersed in an electrolyte and form a complete condenser in itself, at least one of the conductive layers being composed of an appropriate film-forming metal as noted above. If desired, another spacer or separator can be employed with such an assembly, and the assembly rolled into conventional cylindrical form, or several such assemblies can be stacked together, with appropriate separators, to form a flat condenser. The previously described electrodes can also be stacked in flat form with interposed separators to constitute condensers.

In Figure 11 I have shown a modified form of terminal construction adapted for any of the previously described forms of electrodes. In this construction, the electrodes may be produced in the form of a continuous strip 39 embodying strands 18 and wires 19 bonded together by the layers 20 and 21 as in Figure 2, but the terminal is produced by severing the wires 19a, 19b and 19c as at 39a, 39b and 39c, pulling them out of the strip 39 and bending them at right angles to the strip to constitute the terminal 40. It will be noted that the wires 19a, 19b and 19c are preferably severed at different points so that substantially the same amount of each wire will project beyond the edge of the strip 39 to constitute the terminal. The strip may be severed, for example, at the point indicated by the broken line 42 into separate electrodes, the strip being of indefinite length and the terminals 40 being provided at appropriate intervals along the strip.

Figure 12 illustrates another terminal construction. Here again, the electrodes may be produced in the form of a strip 39 embodying strands 18 and wires 19, but in this modification the terminal member constitutes a part of the strip itself, the strip being cut as at 43, and the cut portion folded to extend transversely away from the strip as shown to provide a terminal member 44. As before, the strip 39 may be severed into a plurality of electrodes as indicated by the broken line 42, for example, and again the strip 39 may be of indefinite length with the terminals 44 positioned at appropriate intervals to make electrodes of the desired length and capacity.

Various methods may be employed in producing electrodes according to my invention. Preferably the methods are arranged so that a series of electrodes can be produced by continuous spraying operations, the spraying operations being carried out while the material is in strip or web form, the web later being severed into proper length for electrodes. One such method of producing electrodes such as the electrodes 11 described above is illustrated diagrammatically in Figures 13 and 14. As shown in Figure 13, a plurality of strands 18 and wires 19 of indefinite length may be assembled with terminal wires 22 interwoven transversely of the strands 18 and wires 19 only sufficiently to hold the terminal wires in position until the conductive layers are produced to bond the terminals and parallel strands together; the terminals being spaced distances corresponding to the required lengths of the electrode. A strip embodying such parallel strands and interwoven terminal wires may be wound on a drum 45 as shown in Figure 14, guided by guide rolls 46 and 47 past metallizing guns 48 and 49 which are arranged to direct sprays of molten metal on opposite sides of the strip and wound again on a take-up drum 50. Thereafter, the electrode material can be subjected to a film-forming operation, if the electrodes are intended for use as condenser anodes, and severed into appropriate lengths for electrodes either before or after the film-forming operation. Electrodes embodying terminals of the types shown in Figures 11 and 12 are particularly adapted to continuous production by apparatus such as shown in Figure 14, for the reason that the terminals are produced from the strip itself and the strip can be sprayed or otherwise coated with metal and subjected to the filming operation before the terminals are made.

Another method by which a plurality of electrodes may be formed by a single spraying operation is illustrated in Figure 15 in which a drum 57 is employed to support the strands 18, wires 19, and transversely extending terminal wires 22. In carrying out this method, the transverse wires 22 are positioned on the drum, and the strands 18 and wires 19 wound around them. Thereafter, the drum is rotated while the metallizing gun 55 is employed to produce the required conductive layer. After the spraying operation has been completed, the electrode material may be severed into appropriate lengths, each including a terminal member 22, and removed from the drum. This type of apparatus is particularly convenient where it is desired to employ transverse strands 26 as shown in Figure 6, or where a separator such as the separator 28 of Figure 7 and 8 is to be used as a backing for the electrode. The methods described above can be adapted readily to the production of other types of electrodes embodying the present invention.

In the foregoing description the invention has been described as it may be applied to electrolytic condensers of the so-called "dry" type, but those skilled in the art will appreciate that it is useful in connection with other types of condensers, as well as various electrolytic devices. The drawings illustrate electrodes in which parallel strands are employed, but as noted above parallelism is not necessary, particularly where the layers are made up of untwisted fibers or filmaents. Various adaptations of the invention other than those illustrated herein will also become apparent to those skilled in the art. Therefore, it is to be understood that the foregoing description of preferred forms of my invention is given by way of example and not by way of limitation, the scope of the invention being defined by the appended claims.

I claim:

1. An electrode and separator assembly for electrolytic devices comprising a strip of porous non-conductive material constituting a separator, a layer of unwoven parallel strands extending along one side of said strip parallel thereto and a porous conductive layer of finely divided cohering metallic particles adhering to said strands and strip and bonding said strands to each other and to said strip, said porous conductive layer constituting one electrode, and another layer of unwoven parallel strands extending along the opposite side of said strip parallel thereto and another porous conductive layer of finely divided cohering metallic particles adhering to the strands of said other layer and to said opposite side of said strip and bonding the strands of said other layer to each other and to said strip, said other porous conductive layer constituting another electrode separated from said first electrode by said separator which serves as a barrier to prevent the metallic particles on one side thereof coming in contact with the metallic particles on the other side thereof, and separate terminal means for each of said electrodes.

2. An electrolytic condenser comprising an electrode assembly according to claim 1 wherein at least one of said porous conductive layers is composed of particles of a film-forming metal and is provided with a dielectric film, and a film-maintaining electrolyte permeating said assembly.

JOSEPH B. BRENNAN.

REFERENCES CITED

The following references are of record in the file of this patent:

UNITED STATES PATENTS

| Number | Name | Date |
|---|---|---|
| 2,037,848 | Brennan | Apr. 21, 1936 |
| 2,146,029 | Schimkus | Feb. 7, 1939 |
| 2,177,819 | Booe | Oct. 31, 1939 |
| 2,206,050 | Robinson | July 2, 1940 |
| 2,232,320 | Georgiev | Feb. 18, 1941 |
| 2,232,484 | Shugg | Feb. 18, 1941 |
| 2,280,789 | Brennan | Apr. 28, 1942 |
| 2,299,228 | Grey | Oct. 20, 1942 |
| 2,299,667 | Waterman | Oct. 31, 1942 |
| 2,310,932 | Brennan | Feb. 16, 1943 |

FOREIGN PATENTS

| Number | Country | Date |
|---|---|---|
| 503,370 | Great Britain | Apr. 5, 1939 |